US008171362B2

(12) United States Patent
Grövlen (10) Patent No.: US 8,171,362 B2
(45) Date of Patent: May 1, 2012

(54) APPARATUS, METHOD AND COMPUTER PROGRAM PRODUCT FOR HARQ BUFFER SIZE REDUCTION

(75) Inventor: Asbjörn Grövlen, Salo (FI)

(73) Assignee: Nokia Corporation, Espoo (FI)

( * ) Notice: Subject to any disclaimer, the term of this patent is extended or adjusted under 35 U.S.C. 154(b) by 1065 days.

(21) Appl. No.: 12/079,702

(22) Filed: Mar. 27, 2008

(65) Prior Publication Data

US 2009/0249150 A1    Oct. 1, 2009

(51) Int. Cl.
*G06F 11/00*    (2006.01)
(52) U.S. Cl. ................... 714/748; 455/226.1
(58) Field of Classification Search .......... None
See application file for complete search history.

(56) References Cited

U.S. PATENT DOCUMENTS

| | | | | |
|---|---|---|---|---|
| 6,671,849 | B2* | 12/2003 | Tripathi et al. ............ | 714/746 |
| 7,047,473 | B2* | 5/2006 | Hwang et al. .............. | 714/751 |
| 7,509,554 | B2* | 3/2009 | Lohr et al. ................ | 714/748 |
| 7,657,815 | B2* | 2/2010 | Seidel et al. .............. | 714/748 |
| 2001/0056560 | A1* | 12/2001 | Khan et al. ................ | 714/746 |
| 2003/0133497 | A1* | 7/2003 | Kinjo et al. ............... | 375/152 |
| 2007/0106924 | A1* | 5/2007 | Seidel et al. .............. | 714/748 |
| 2009/0077444 | A1* | 3/2009 | Qi et al. ................... | 714/748 |
| 2009/0147726 | A1* | 6/2009 | Tseng ....................... | 370/315 |
| 2010/0050034 | A1* | 2/2010 | Che et al. .................. | 714/748 |
| 2010/0067481 | A1* | 3/2010 | Maeda ...................... | 370/331 |
| 2010/0325502 | A1* | 12/2010 | Lindskog et al. ........... | 714/748 |
| 2011/0004797 | A1* | 1/2011 | Gerstenberger et al. ...... | 714/748 |
| 2011/0173508 | A1* | 7/2011 | Wehinger ................... | 714/748 |

FOREIGN PATENT DOCUMENTS

| | | |
|---|---|---|
| EP | 0 635 952 A1 | 1/1995 |
| EP | 1 337 066 A1 | 8/2003 |
| EP | 1 482 670 A1 | 12/2004 |
| EP | 1 501 232 A1 | 1/2005 |
| WO | WO-2005/107127 A1 | 11/2005 |

OTHER PUBLICATIONS

Section 9.1 of 3GPP TR 36.300 Technical Report, 3$^{rd}$ Geneation Partnership Project; Technical Specification Group Radio Access Network; Evolved Universal Terrestrial Radio Access (E-UTRA) and Evolved Universal Terrestrial Radio Access Network (E_UTRAN); Overall description; Stage 2 (Release 8); 3GPP TS 36.300 V.8.4.0 (Mar. 2008), 126 pgs.

* cited by examiner

*Primary Examiner* — Christopher McCarthy
(74) *Attorney, Agent, or Firm* — Harrington & Smith (57) ABSTRACT

Apparatus, methods and computer program products implement HARQ buffer size reduction by storing successfully received blocks of a multi-block signal in a code block buffer and only storing unsuccessfully received blocks of the multi-block signal in the HARQ buffer. As HARQ retransmissions of the signal occur, previous successfully received blocks are discarded. Blocks that were not successfully received in one or more previous signals but are successfully received in a HARQ retransmission are saved in the code block buffer. The process may continue until all blocks of the multi-block signal have been successfully decoded received and stored in the code block buffer. The successfully received blocks of the multi-block signal are then passed to higher layers.

22 Claims, 4 Drawing Sheets

APPARATUS, METHOD AND COMPUTER PROGRAM PRODUCT FOR HARQ BUFFER SIZE REDUCTION

TECHNICAL FIELD

The exemplary and non-limiting embodiments of this invention relate generally to wireless communication systems, methods, devices and computer program products and, more specifically, relate to systems, methods, devices and computer program products that reduce signal retransmission buffering requirements in electronic devices operative in wireless communications systems.

BACKGROUND

The following abbreviations are herewith defined:
3GPP third generation partnership project
ARQ automatic repeat request
BLER block error ratio
C/I carrier to interference ratio
CQI channel quality indicator
DL downlink
HARQ hybrid ARQ
LTE long term evolution
Node B base station
eNB EUTRAN Node B
OFDMA orthogonal frequency division multiple access
PRB physical resource block
PS Packet Scheduler
TTI transmission timing interval
UL uplink
UE user equipment
UTRAN universal terrestrial radio access network
EUTRAN evolved UTRAN
aGW access gateway A proposed communication system known as evolved UTRAN (E-UTRAN, also referred to as UTRAN-LTE) is at present a study item within the 3GPP. The current working assumption is that the access technique will be OFDMA for the DL, which can be expected to provide an opportunity to perform link adaptation and user multiplexing in the frequency domain.

In an E-UTRAN system signal retransmission is implemented in an Hybrid Automatic Repeat Request ("HARQ") process. As is described in section 9.1 of 3GPP TS 36.300 Technical Report, 3rd Generation Partnership Project; Technical Specification Group Radio Access Network; Physical layer aspects for evolved Universal Terrestrial Radio Access (UTRA), in general HARQ can be classified as being synchronous or asynchronous.

Synchronous HARQ implies that (re)transmissions for a certain HARQ process are restricted to occur at known time instants. No explicit signaling of the HARQ process number is required as the process number can be derived from, e.g., the subframe number.

Asynchronous HARQ implies that (re)transmission for a certain HARQ process may occur at any time. Explicit signaling of the HARQ process number is therefore required. In principle, synchronous operation with an arbitrary number of simultaneous active processes at a time instant could be envisioned. In this case, additional signaling may be required. Asynchronous operation already supports an arbitrary number of simultaneous active processes at a time instant. Furthermore, note that, in a synchronous scheme the transmitter may choose not to utilize all possible retransmission instants, e.g., to support pre-emption. This may require additional signaling.

The various forms of HARQ are further classified as adaptive or non-adaptive in terms of transmission attributes, e.g., the resource unit (RU) allocation, modulation and transport block size, and the duration of the retransmission. Control channel requirements can be different for each case.

Adaptive HARQ implies that the transmitter may change some or all of the transmission attributes used in each retransmission, as compared to the initial transmissions (e.g. due to changes in the radio conditions). Hence, the associated control information needs to be transmitted with the retransmission. The changes considered are: modulation, resource unit allocation and duration of transmission.

Non-adaptive HARQ implies that changes, if any, in the transmission attributes for the retransmissions are known to both the transmitter and receiver at the time of the initial transmission. Hence, associated control information need not be transmitted for the retransmission.

The capability to adaptively change the packet format (i.e., adaptive IR) and the transmission timing (i.e., asynchronous IR) yields an adaptive, asynchronous IR based HARQ operation. Such a scheme has the potential of optimally allocating the retransmission resources in a time varying channel. For each HARQ retransmission, control information about the packet format needs to be transmitted together with the data sub-packet.

The various types of HARQ retransmission processes can have a significant impact on the complexity of user equipment and other electronic devices that are configured to receive HARQ retransmissions. In particular, in order to support IR HARQ, where retransmissions can contain different channel bits than the original transmissions, the UE needs to have a large buffer that can store all the channel bits for all the HARQ processes that are involved. In UE intended to operate in an EUTRAN wireless communications system, this buffer in conventional systems is very large and comprises a significant part of the modem application-specific integrated circuit ("ASIC"). This may require a 10 Mbit buffer occupying a region 15 mm$^2$ on the die of the ASIC.

Various conventional techniques have been proposed to reduce HARQ buffering requirements. In one such scheme implemented in an HSDPA modem the size of the buffer was reduced by only allowing chase combining. The performance of this method has been found to be lacking. It is also known that the size of the buffer can be reduced by taking the probability of buffer overflow into account. Problems have been found in such methods associated with buffer segmentation when receiving different transport block sizes. Also, having one CRC per turbo code block instead of per transport block has been proposed for power saving reasons.

Each of these conventional methods have limitations, and those skilled in the art seek apparatus, methods and computer program products that overcome the limitations of the prior art.

SUMMARY OF THE INVENTION

An embodiment of the invention is an electronic device comprising: a radio apparatus configured to receive communications in a wireless communications network, wherein the communications comprise multi-block original signals and retransmission signals; and a controller configured to decode an original signal; to determine whether the original signal was received correctly and when it is determined that only a portion of the original signal was received correctly to save blocks corresponding to the correctly-received portion in a first buffer and to save remaining blocks corresponding to an incorrectly received portion in a second buffer; to receive a retransmission signal; to decode only that portion of the retransmission which corresponds to the incorrectly-received portion of the original signal and to discard a portion which corresponds to the previous correctly received portion; to determine whether blocks corresponding to the decoded, retained portion have been correctly received; for blocks that have been received correctly to place the correctly received blocks in the first buffer and for blocks that have been incorrectly received to place the incorrectly received blocks in the second buffer; to continue receiving and performing operations on retransmitted signals until all the blocks have been correctly received; and when all blocks have been correctly received, to pass the correctly received blocks to a higher layer.

Another embodiment of the invention is a computer program product comprising a computer readable memory medium tangibly embodying a computer program, the computer program configured to control an electronic device, wherein when the computer program is executed the electronic device is configured to perform operations, the operations comprising: receiving a multi-block signal; decoding blocks comprising the multi-block signal; determining whether all blocks have been received correctly; when all blocks have been received correctly, placing the decoded blocks in a first buffer and passing them to a higher layer; and when all blocks have not been received correctly, determining which blocks have been received correctly; for blocks that have been received correctly placing the correctly received blocks in the first buffer and the incorrectly received blocks in a second buffer; receiving a retransmission of the received signal; decoding the retransmitted signal; discarding blocks from the retransmitted signal corresponding to previous correctly received blocks; determining whether the remaining blocks have been correctly received; for blocks that have been received correctly placing the correctly received blocks in the first buffer and the incorrectly received blocks in the second buffer; continuing to receive and perform operations on retransmitted signals until all the blocks have been correctly received; and when all blocks have been correctly received, passing the correctly received blocks to the higher layer.

A further embodiment of the invention is a method comprising: at an electronic device operative in a wireless communications system, receiving a multi-block signal; decoding blocks comprising the multi-block signal; determining whether all blocks have been received correctly; when all blocks have been received correctly, placing the decoded blocks in a decode buffer and passing them to a higher layer; and when all blocks have not been received correctly, determining which blocks have been received correctly; for blocks that have been received correctly placing the correctly received blocks in a first buffer and the incorrectly received blocks in a second buffer; receiving a retransmission of the received signal; decoding the retransmitted signal; discarding blocks from the retransmitted signal corresponding to previous correctly received blocks; determining whether the remaining blocks have been correctly received; for blocks that have been received correctly placing the correctly received blocks in the first buffer and the incorrectly received blocks in the second buffer; continuing to receive and perform operations on retransmitted signals until all the blocks have been correctly received; and when all blocks have been correctly received, passing the correctly received blocks to the higher layer.

Yet another embodiment of the invention is an apparatus comprising: an input configured to accept communications received by radio apparatus operative in a wireless communications network, wherein the communications comprise multi-block original signals and retransmission signals; and a controller coupled to the input, the controller configured to decode an original signal; to determine whether the original signal was received correctly and when it is determined that only a portion of the original signal was received correctly to save blocks corresponding to the correctly-received portion in a first buffer and to save remaining blocks corresponding to an incorrectly received portion in a second buffer; to receive a retransmission signal; to decode only that portion of the retransmission which corresponds to the incorrectly-received portion of the original signal and to discard a portion which corresponds to the previous correctly received portion; to determine whether blocks corresponding to the decoded, retained portion have been correctly received; for blocks that have been received correctly to place the correctly received blocks in the first buffer and for blocks that have been incorrectly received to place the incorrectly received blocks in the second buffer; to continue receiving and performing operations on retransmitted signals until all the blocks have been correctly received; and when all blocks have been correctly received, to pass the correctly received blocks to a higher In conclusion, the foregoing summary of the embodiments of the present invention is exemplary and non-limiting. For example, one of ordinary skill in the art will understand that one or more aspects or steps from one embodiment can be combined with one or more aspects or steps from another alternate embodiment to create a new embodiment within the scope of the present invention.

DETAILED DESCRIPTION

Figure 1:
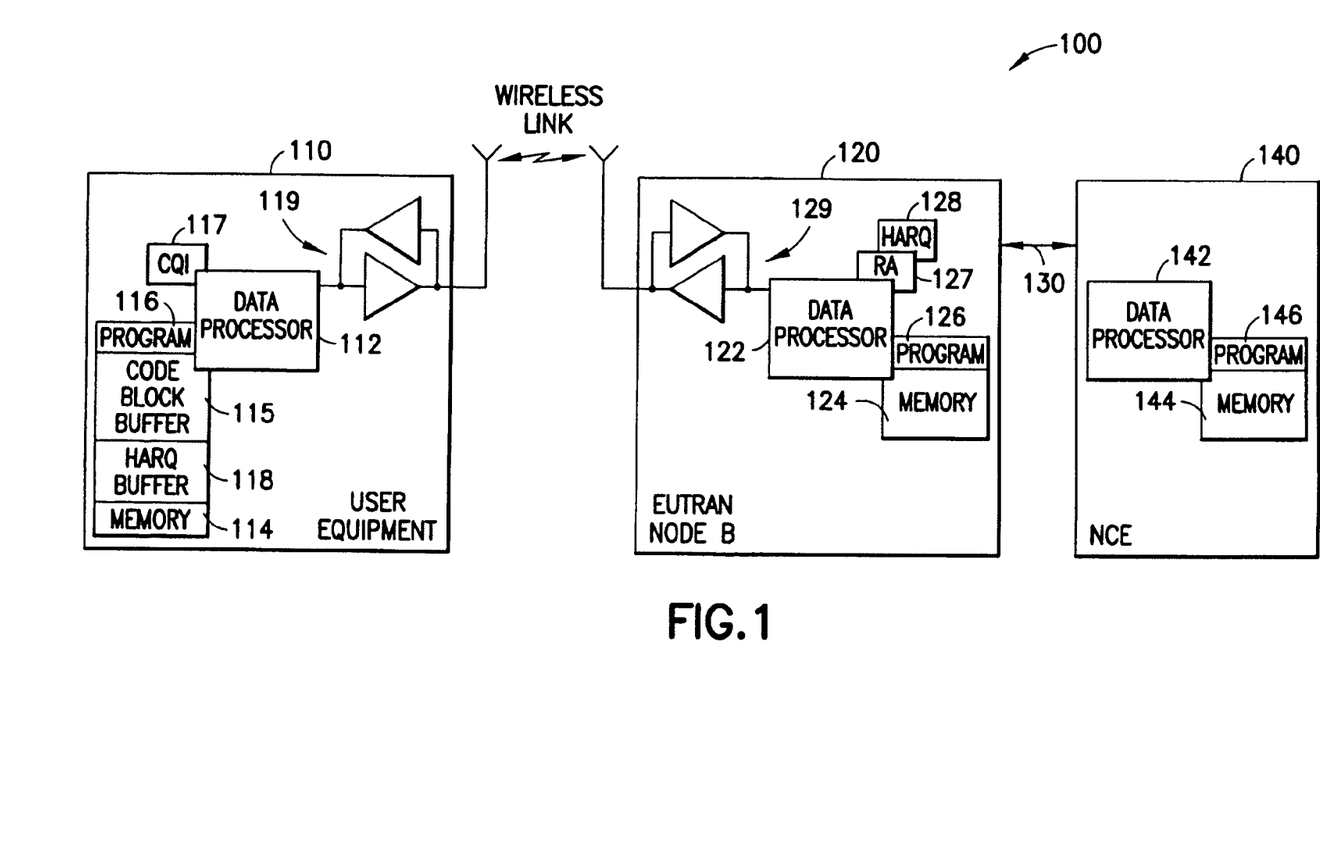
FIG. 1 is a block diagram depicting a wireless communications network in which the invention may be practiced.

Reference is made to FIG. 1 for illustrating a simplified block diagram of various electronic devices that are suitable for use in practicing the exemplary embodiments of this invention. In FIG. 1 a wireless network 100 is adapted for communication with at least one UE 110 via a Node B (base station), which for LTE is referred to as the eNB 120. The network 100 may include a network element (NE) 140, such as an aGW. The UE 110 includes a data processor (DP) 112, a memory (MEM) 114 that stores a program (PROG) 116, a code block buffer 115 and a HARQ buffer 118, and a suitable radio frequency (RF) transceiver 119 for bidirectional wireless communications with the eNB 120. Base station eNB 120 also includes a DP 122, a MEM 124 that stores a PROG 126, and a suitable RF transceiver 129. The eNB 120 is coupled via a data path 130 to the NE 140 that also includes a DP 142 and a MEM 144 storing an associated PROG 146.

Also shown in FIG. 1 there is a frequency domain Resource Allocator 127 and a HARQ function 128 located at the eNB 120. These two units cooperate with one another during the operation of the eNB 120, as will be discussed below. The UE 110 may include a CQI unit 117 for reporting CQI information to the eNB 120.

For the embodiment shown in FIG. 1 at least the PROG 126 is assumed to include program instructions that, when executed by the associated DP, enable the electronic device to operate in accordance with the exemplary embodiments of this invention, as will be discussed below in greater detail.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 122, or by hardware, or by a combination of software and hardware.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

Figure 2:
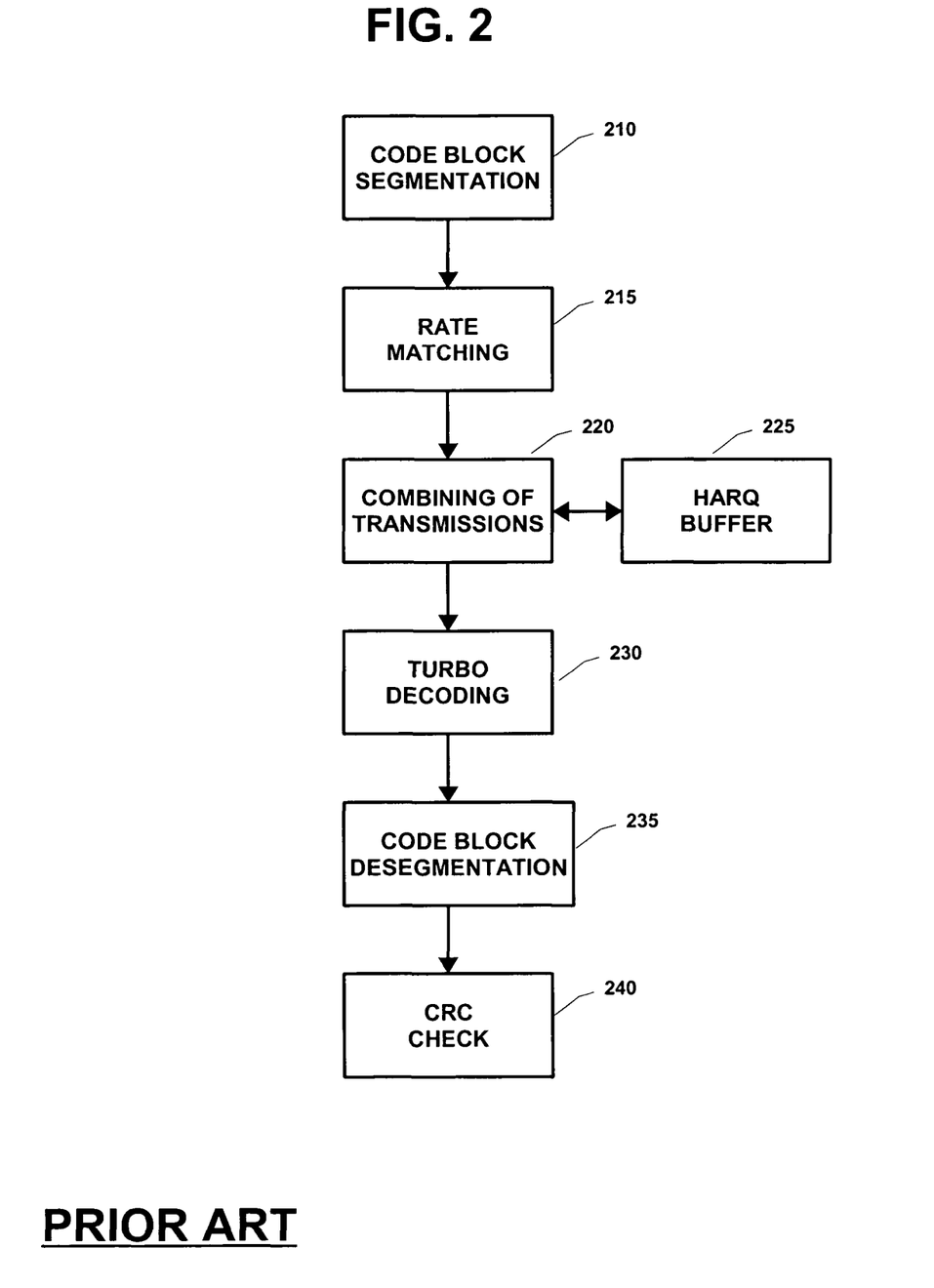
FIG. 2 is a conceptual block diagram depicting a processing chain in accordance with the prior art.

An aspect of the invention is an improved processing chain over that of the prior art. FIG. 2 depicts one such conventional processing chain. In the conventional processing chain depicted in FIG. 2, a multi-block signal is segmented at block 210. Then rate matching is performed at block 215. Transmissions are combined at 220, and intermediate results are stored in HARQ buffer 225. Turbo decoding is performed at 230. Then, the code blocks are desegmented at 235, and finally a CRC check is performed at 240.

Figure 3:
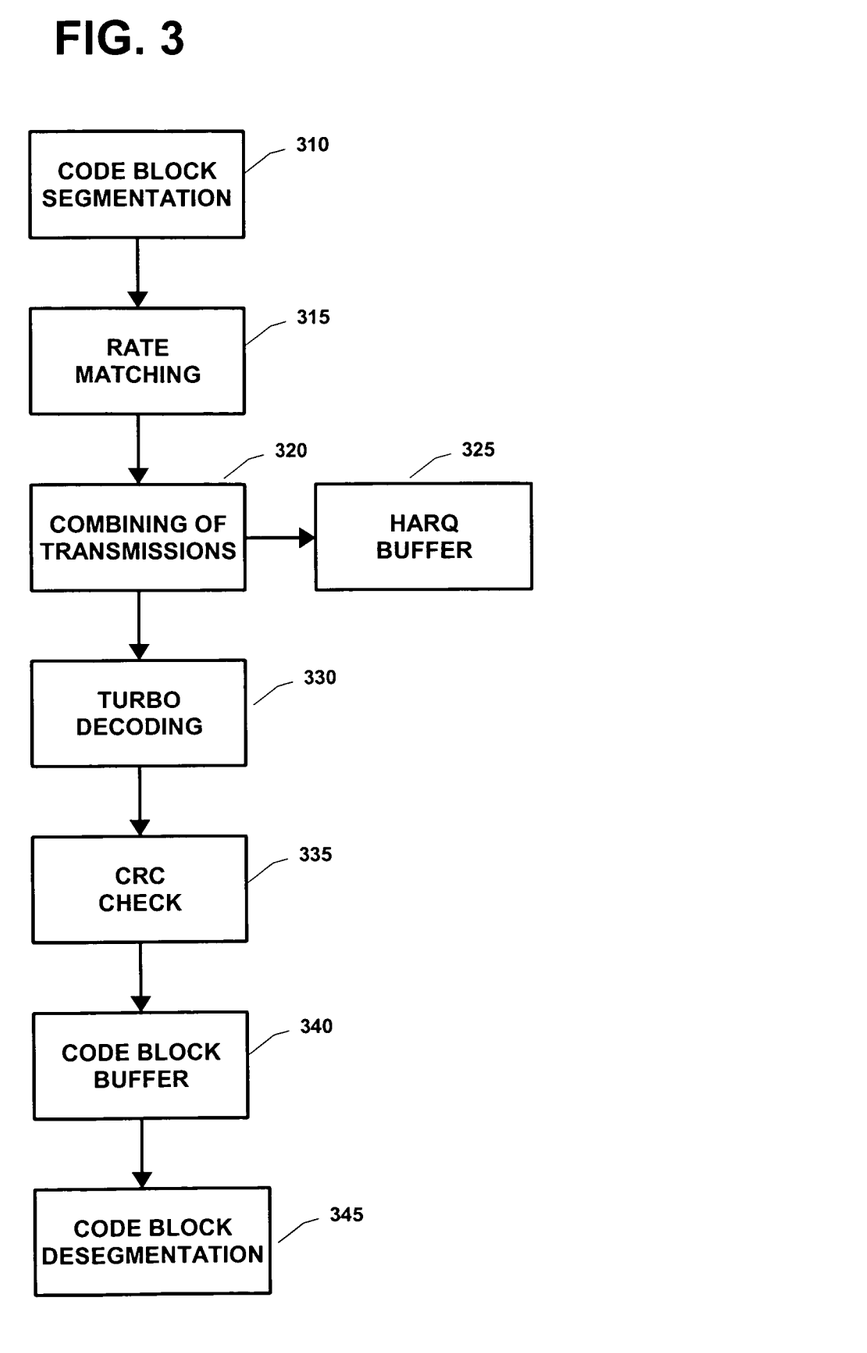
FIG. 3 is a conceptual block diagram depicting a processing chain in accordance with the invention.

In contrast to the conventional processing chain depicted in FIG. 2, a processing chain operating in accordance with the invention has an additional code block buffer 340 as depicted in FIG. 3. In the processing chain of the invention depicted in FIG.3, a multi-block signal is segmented at block 310. Then rate matching is performed at block 315. Transmissions are combined at 320, and intermediate unsuccessfully received results are stored in HARQ buffer 325. Turbo decoding is performed at 330 and a CRC check is performed at 335. As blocks are successfully received, the successfully received blocks are stored in code block buffer 340. The process continues until all blocks comprising the multi-block signal have been successfully received. Then at block 345 the blocks comprising the multi-block signal are desegmented and passed onto a higher layer.

In an exemplary embodiment of the invention, for the first transmission all code blocks are decoded. Code blocks that were successfully decoded are stored in the code block buffer with hard bits while the unsuccessfully decoded code blocks are stored in the HARQ buffer with soft bits. If all blocks were successfully decoded, the entire transport block is passed to higher layers.

When a retransmission arrives, only the blocks that were unsuccessfully decoded in the previous transmission are decoded this time, i.e., channel bits from all other code blocks are discarded. Again the blocks that are successfully decoded are put in there and their place in the HARQ-buffer is freed. If all code blocks in the transport block were successfully decoded, the code blocks are concatenated in the correct order and the entire transport block is passed to higher layers.

The HARQ-buffer is partitioned into segments of equal size of the number of channel bits corresponding to the largest code block size. There is a possibility of multiplexing smaller code blocks into one segment, but this comes at the cost of more complicated buffer management.

The code block buffer is segmented into segments of the same size as the maximum code block size.

The UE needs to keep a record of which code blocks within a transport block that have been correctly received and which segments are in the HARQ buffer.

Figure 4:
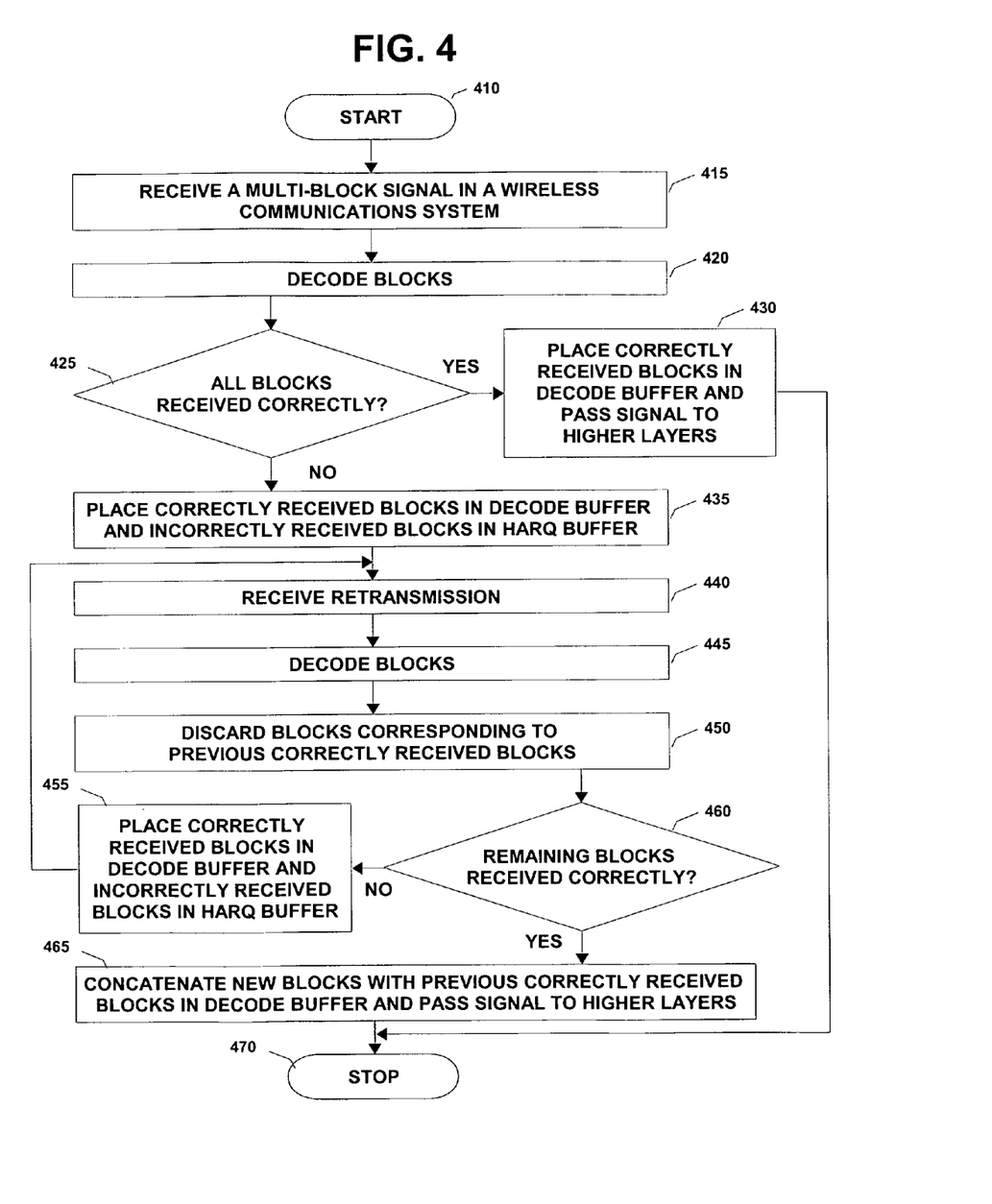
FIG. 4 is a flowchart depicting a method operating in accordance with the invention.

FIG. 4 is a flowchart depicting a method operating in accordance with the invention. The method starts at 410. Next, at 415 an electronic device like UE 110 depicted in FIG. 1 that is operative in wireless communication system 100 receives a multi-block signal. Then, at 420, the electronic device 110 decodes the blocks comprising the multi-block signal. Next, at decisions diamond 425 the electronic device 110 determines whether all blocks comprising the signal have been received correctly. If "yes", the method proceeds next to 430 where the electronic device 110 places correctly received blocks in a decode buffer like that depicted in FIG. 3 which then passes the successfully received and decoded blocks of the signal to high layers. The method then stops at 470. If the determination corresponds to "no", i.e., not all of the blocks comprising the multi-block signal have been successfully received, the method proceeds to 435 where the electronic device 110 places correctly received blocks in the decode buffer and the incorrectly received blocks in the HARQ buffer. Next, at 440 the electronic device 110 receives a retransmission of the signal. Then, at 445 the electronic device 110 decodes the blocks. Next, at 450 the electronic device discards blocks that correspond to previous correctly received blocks. Then, at decision diamond 460, the electronic device 110 determines whether the remaining blocks corresponding to blocks that have not been received successfully in a prior signal have been received successfully in the retransmitted signal. If no, the electronic device proceeds to 455 and places correctly received blocks in the decode buffer and incorrectly received blocks in the HARQ buffer. The method returns to 440 to receive a retransmission corresponding to the original signal and repeats steps 445-460 until all blocks comprising the multi-block signal have been successfully received. If at 460 the electronic device determines that all remaining blocks have been successfully received, the method continues to 465 where the new correctly received blocks are concatenated with previous correctly received blocks in the decode buffer. All of the blocks comprising the multi-block signal are then passed to higher layers. The method then stops at 470.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it should be understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. For example, the described number of PRBs, as well as the various types of scheduling algorithms, are exemplary, and should not be read as limitations upon the practice of the exemplary embodiments of this invention. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   a processor;
   a memory including computer program code, where the memory and computer program code are configured, with the processor, to cause the apparatus to receive communications in a wireless communications network, wherein the communications comprise multi-block original signals and retransmission signals;
   where the processor is configured to decode an original signal; to determine whether the original signal was received correctly and when it is determined that only a portion of the original signal was received correctly to save blocks corresponding to the correctly-received portion in a first buffer as hard bits and to save remaining blocks corresponding to an incorrectly received portion in a second buffer; to receive a retransmission signal; to decode only that portion of the retransmission which corresponds to the incorrectly-received portion of the original signal and to discard a portion which corresponds to the previous correctly received portion; to determine whether blocks corresponding to the decoded, retained portion have been correctly received; for blocks that have been received correctly to place the correctly received blocks in the first buffer and for blocks that have been incorrectly received to place the incorrectly received blocks in the second buffer; to continue receiving and performing operations on retransmitted signals until all the blocks have been correctly received; and when all blocks have been correctly received, to pass the correctly received blocks to a higher layer.

2. The apparatus of claim 1 wherein the wireless communications system is an EUTRAN wireless communications system.

3. The apparatus of claim 1 wherein the retransmission is a hybrid automatic repeat request retransmission.

4. The apparatus of claim 1 wherein the first buffer is a hybrid automatic repeat request buffer.

5. The apparatus of claim 1 wherein the second buffer is a code block buffer.

6. The apparatus of claim 1 wherein the first buffer and second buffer comprise separate portions of a larger buffer.

7. The apparatus of claim 6 wherein the larger buffer comprises a single memory device.

8. The apparatus of claim 1 wherein the hard bits are compressed.

9. The electronic device apparatus of claim 1 wherein incorrectly received blocks are stored as soft bits in the second buffer.

10. The apparatus of claim 9 wherein the soft bits comprises integers.

11. A non-transitory computer readable medium storing a program of machine-readable instructions executable by a digital processing apparatus, where execution of said instructions results in performance of operations that comprise:
    receiving a multi-block signal; decoding blocks comprising the multi-block signal; determining whether all blocks have been received correctly;
    when all blocks have been received correctly, placing the decoded blocks in a decode buffer and passing the decoded blocks to a higher layer; and when all blocks have not been received correctly, determining which blocks have been received correctly;
    for blocks that have been received correctly placing the correctly received blocks in a first buffer as hard bits and the incorrectly received blocks in a second buffer;
    receiving a retransmission of the received signal; decoding the retransmitted signal;
    discarding blocks from the retransmitted signal corresponding to previous correctly received blocks; determining whether the remaining blocks have been correctly received;
    for blocks that have been received correctly placing the correctly received blocks in the first buffer and the incorrectly received blocks in the second buffer; continuing to receive and perform operations on retransmitted signals until all the blocks have been correctly received; and
    when all blocks have been correctly received, passing the correctly received blocks to the higher layer.

12. The non-transitory computer readable medium of claim 11 wherein the wireless communications system is an EUTRAN wireless communications system.

13. The non-transitory computer readable medium of claim 11 wherein the retransmission is a hybrid automatic repeat request retransmission.

14. The non-transitory computer readable medium of claim 11 wherein the first buffer is a hybrid automatic repeat request buffer.

15. The non-transitory computer readable medium of claim 11 wherein the second buffer is a code block buffer.

16. A method comprising:
    at an electronic device operative in a wireless communications system, receiving a multi-block signal;
    decoding blocks comprising the multi-block signal;

determining whether all blocks have been received correctly;

when all blocks have been received correctly, placing the decoded blocks in a decode buffer and passing them to a higher layer; and when all blocks have not been received correctly, determining which blocks have been received correctly; for blocks that have been received correctly placing the correctly received blocks in a first buffer as hard bits and the incorrectly received blocks in a second buffer;

receiving a retransmission of the received signal; decoding the retransmitted signal; discarding blocks from the retransmitted signal corresponding to previous correctly received blocks;

determining whether the remaining blocks have been correctly received; for blocks that have been received correctly placing the correctly received blocks in the first buffer and the incorrectly received blocks in the second buffer;

continuing to receive and perform operations on retransmitted signals until all the blocks have been correctly received; and when all blocks have been correctly received, passing the correctly received blocks to the higher layer.

17. The method of claim 16 wherein the wireless communications system is an EUTRAN wireless communications system.

18. The method of claim 17 wherein the retransmission is a hybrid automatic repeat request retransmission.

19. The method of claim 17 wherein the first buffer is a hybrid automatic repeat request buffer.

20. The method of claim 17 wherein the second buffer is a code block buffer.

21. Apparatus comprising:

a processor;

a memory including computer program code, where the memory and computer program code are configured, with the processor, to cause the apparatus to receive communications that comprise multi-block original signals and retransmission signals;

to decode an original signal;

to determine whether the original signal was received correctly and when it is determined that only a portion of the original signal was received correctly to save blocks corresponding to the correctly-received portion in a first buffer as hard bits and to save remaining blocks corresponding to an incorrectly received portion in a second buffer;

to receive a retransmission signal; to decode only that portion of the retransmission which corresponds to the incorrectly-received portion of the original signal and to discard a portion which corresponds to the previous correctly received portion; to determine whether blocks corresponding to the decoded, retained portion have been correctly received;

for blocks that have been received correctly to place the correctly received blocks in the first buffer and for blocks that have been incorrectly received to place the incorrectly received blocks in the second buffer;

to continue receiving and performing operations on retransmitted signals until all the blocks have been correctly received; and when all blocks have been correctly received, to pass the correctly received blocks to a higher layer.

22. The apparatus of claim 21 wherein the apparatus further comprises an integrated circuit.

* * * * *

UNITED STATES PATENT AND TRADEMARK OFFICE
CERTIFICATE OF CORRECTION

| | | |
|---|---|---|
| PATENT NO. | : 8,171,362 B2 | Page 1 of 1 |
| APPLICATION NO. | : 12/079702 | |
| DATED | : May 1, 2012 | |
| INVENTOR(S) | : Asbjorn Grovlen | |

It is certified that error appears in the above-identified patent and that said Letters Patent is hereby corrected as shown below:

Claim 9, col. 8, line 20 delete "electronic device" in-between the and apparatus.

Signed and Sealed this
Third Day of July, 2012

David J. Kappos
*Director of the United States Patent and Trademark Office*